United States Patent [19]
Karino et al.

[11] Patent Number: 5,643,475
[45] Date of Patent: Jul. 1, 1997

[54] POWER SUPPLY APPARATUS

[75] Inventors: Kunio Karino, Suita; Haruo Moriguchi, Itami; Toshikazu Fujiyoshi, Kawanishi; Atsushi Kinoshita, Osaka; Takashi Hashimoto, Kobe, all of Japan

[73] Assignee: Sansha Electric Manufacturing Company, Limited, Osaka, Japan

[21] Appl. No.: 554,657

[22] Filed: Nov. 8, 1995

[30] Foreign Application Priority Data

Nov. 9, 1994 [JP] Japan .................... 6-301460

[51] Int. Cl.$^6$ .................... B23K 10/00
[52] U.S. Cl. ............. 219/121.57; 219/121.54; 219/121.39; 219/130.4; 363/65
[58] Field of Search ............ 219/121.52, 121.54, 219/121.57, 121.39, 130.2, 130.1, 130.4, 130.51; 323/268–271; 363/20, 21, 58–61, 65, 71

[56] References Cited

U.S. PATENT DOCUMENTS

| | | | |
|---|---|---|---|
| 3,581,224 | 5/1971 | Nercessian | 330/99 |
| 3,600,663 | 8/1971 | Wagner | 321/10 |
| 3,637,974 | 1/1972 | Tajbl et al. | 219/135 |
| 4,105,437 | 8/1978 | Liu | 75/10 R |
| 4,156,150 | 5/1979 | Harrigan et al. | 307/2 |
| 5,267,136 | 11/1993 | Suga et al. | 363/65 |

OTHER PUBLICATIONS

Toshiba Review, vol. 20, No. 12, Dec. 1965, pp. 1127–1131, "Point–Source Discharge Lamps," by M. Tanibayashi et al., with partial translation of p. 1130.

Brochure advertising "Safe–Arc™ Electronic Ballast HTI Series," published for Walker Power, Inc., Warner, New Hampshire, Feb. 1992.

Brochure advertising "Safe–Arc Xenon–150 Electronic Ballast," published for WPI Electronics, Warner, New Hampshire, Nov. 1992.

Brochure advertising "Safe–Arc™ Electronic Ballast HMI/ MSR 1200," published for WPI Electronics, Warner, New Hampshire, August 1993.

Brochure advertising "Safe–Arc™ Electronic Ballast HMI/ MSR Series," published for Walker Power, Inc., Warner, New Hampshire, Jan. 1991.

Toshiba Review, vol. 20, No. 12, 1965, pp. 1127–1132; Tokyo Shibaura Electronic Co., Ltd.; "Point–Source Discharge Lamps" by M. Tanibayashi et al., with partial translation of p. 1130.

Safe–Arc™ Electronic Ballast advertisement.

*Primary Examiner*—Mark H. Paschall
*Attorney, Agent, or Firm*—William H. Murray; N. Stephan Kinsella

[57] ABSTRACT

A power supply apparatus for a plasma arc cutter includes an inverter which converts DC power to high-frequency power. An output developing circuit rectifies and smooths the high-frequency power for application between a torch electrode and a workpiece which form together a plasma load. A current detecting unit detects current flowing through the plasma load. A reference signal generating unit generates a reference signal including a preset DC signal and a predetermined AC signal superposed on the DC signal. A control units control the inverter, in accordance with the difference between the output of the current detecting unit and the reference signal, so that the output current to be supplied between the electrode and the workpiece has a predetermined constant DC current and a predetermined AC current superposed on the DC current.

The reference signal generating unit can vary the frequency and amplitude of the AC signal in the reference signal.

4 Claims, 3 Drawing Sheets

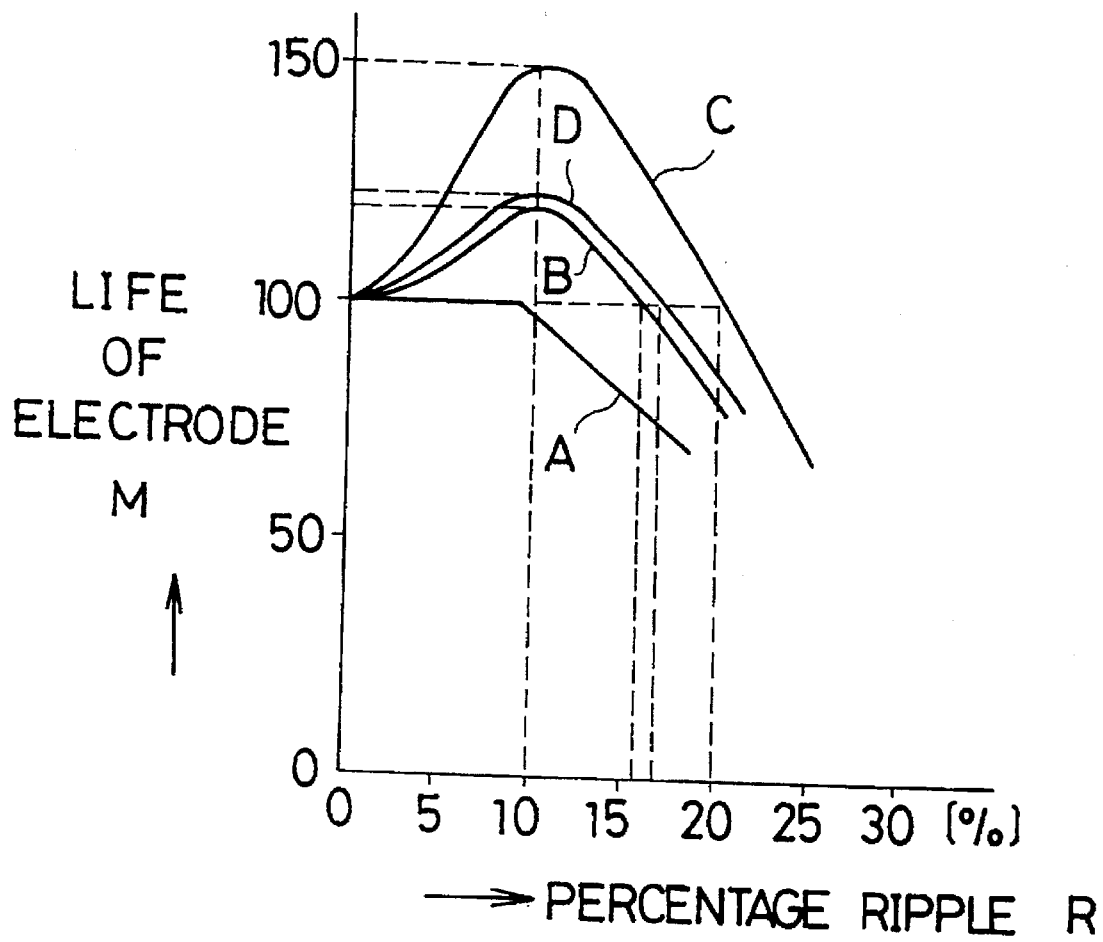
F I G. 4

POWER SUPPLY APPARATUS present invention relates to a power supply apparatus for use with a system which generates a plasma arc for processing a workpiece, such as a plasma arc welder and a plasma arc cutter.

BACKGROUND OF THE INVENTION

Generally, plasma arc cutting machines and plasma arc welding machines are arranged such that DC current from a plasma arc power supply apparatus (hereinafter referred simply to power supply apparatus) is caused to flow between an electrode and a workpiece, which form together a plasma load, to thereby generate a plasma arc between them in order to cut or weld the workpiece.

The power supply apparatus has its positive output coupled to the workpiece, and has its negative output coupled to one end of an electrode of a plasma torch. The plasma torch electrode is a cylinder of a metal, such as copper, having a relatively high electrical conductivity. In the other end of the torch electrode, a refractory material, such as hafnium, tungsten, and zirconium, is embedded. The torch electrode is surrounded by a nozzle with a spacing disposed therebetween. The nozzle includes an opening at its tip end.

In a plasma arc cutter, for example, while a plasma gas, such as compressed air, oxygen, argon, hydrogen, and nitrogen, is being fed into the space between the nozzle and the torch electrode, DC current from the power supply apparatus is applied between the torch electrode and a workpiece having a gap formed therebetween. A high voltage is applied between the electrode and the workpiece for a short time in the initial stage to generate a pilot arc in the gap. The pilot arc induces a plasma arc between the electrode and the workpiece, and the generated plasma arc is used to cut the workpiece. The plasma arc is generated from the refractory material at the tip end of the electrode and is directed to the workpiece through the opening at the tip of the nozzle.

The refractory material as a source of a plasma arc is consumed as it is operated, and when the amount of the refractory material decreases below a predetermined limit, no plasma arc can be generated. In other words, the life of that torch electrode comes to the end. Then, a new electrode is substituted.

It has been considered that the amount of refractory material of the electrode consumed is smaller as the amount of ripples contained in the DC current applied between the electrode and a workpiece is smaller. Accordingly, a constant current power supply apparatus used to be employed.

In a constant current power supply apparatus, AC power is rectified and smoothed into DC power, the DC power is converted to high-frequency power by means of a high-frequency inverter, the high-frequency power voltage is lowered by means of a transformer, and, then, the lowered voltage high-frequency power is rectified and smoothed into DC power. The obtained DC current is then applied between the torch electrode and a workpiece. The DC current is detected by a detector, and the inverter is controlled in accordance with the detection value from the detector to maintain the DC current constant. The constant current control provides DC constant current with reduced ripples to be applied between the electrode and a workpiece.

The inventors have recognized that the reduction of ripples in the DC current to be applied between the electrode and a workpiece in order to lengthen the life of the electrode does not necessarily reduce the amount of refractory material consumed. They have found that sometimes the use of DC current containing a larger amount of ripples than ever lengthens the life of electrodes.

The inventors have determined the relationship between the frequency and amplitude of ripples contained in DC current from a power supply apparatus and the amount of refractory material consumed, by experiments. The present invention is based on the results of the experiments, and its object is to provide a power supply apparatus with an increased lifetime.

SUMMARY OF THE INVENTION

A power supply apparatus according to the present invention supplies DC current between an electrode and a workpiece, which form together a plasma lead, to generate a plasma arc between the electrode and the workpiece. AC current is superposed on the DC current. The AC current has a frequency of from 100 Hz to 500 Hz, and has a peak-to-peak value of greater than 0% and smaller than 15.5% of the value of the DC current.

In an alternative form of the invention, AC current having a frequency of from 300 Hz to 500 Hz and having a peak-to-peak value of greater than 0% and smaller than 16.5% of the value of the DC current may be used.

In still another alternative, AC current having a frequency of from 300 Hz to 360 Hz and having a peak-to-peak value of greater than 0% and smaller than 20% of the value of the DC current may be supposed on the DC current.

In still other alternative, AC current having a frequency of from 100 Hz to 500 Hz and having a peak-to-peak value of 10% of the value of the DC current may be supposed on the DC current.

According to an aspect of the invention, a power supply apparatus includes inverter means for converting DC power to AC power. Output producing means rectifies and smooths the AC power from the inverter means, and produces output current to be supplied between an electrode and a workpiece which together form a plasma load. Current detecting means detects the output current. Reference signal generating means generates a reference signal which includes a preset DC signal and a predetermined AC signal superposed on the DC signal. Control means controls the inverter means in accordance with the difference between the output signal of the current detecting means and the reference signal in such a manner that the inverter means develops the output current including a predetermined constant DC current on which a predetermined AC current is superposed. The reference signal generating means can vary the frequency and amplitude of the AC signal contained in the reference signal.

By varying the frequency of the AC signal in the reference signal, the frequency of the AC current can be adjusted within a range of from 100 Hz to 500 Hz, and by varying the amplitude of the AC signal in the reference signal, the amplitude of the AC current can be adjusted to a value within a range of greater than 0% and smaller than 15.5% of the value of the DC current.

By varying the frequency of the AC signal in the reference signal, the frequency of the AC current can be adjusted within a range of from 300 Hz to 500 Hz, and by varying the amplitude of the AC signal in the reference signal, the amplitude of the AC current can be adjusted to a value within a range of greater than 0% and smaller than 16.5% of the value of the DC current.

By varying the frequency of the AC signal in the reference signal, the frequency of the AC current can be adjusted within a range of from 300 Hz to 360 Hz, and by varying the amplitude of the AC signal in the reference signal, the amplitude of the AC current can be adjusted to a value within a range of greater than 0% and smaller than 20% of the value of the DC current.

BRIEF DESCRIPTION OF THE DRAWINGS

FIG. 4 is a graph showing the relationship between the lifetime of the electrode of the plasma arc cutter shown in FIG. 1 and the amplitude of ripples contained in a current to be supplied between the cutter electrode and the workpiece.

DESCRIPTION OF PREFERRED EMBODIMENT

A plasma arc cutter with a power supply apparatus according to one embodiment of the present invention is described with reference to the accompany drawings.

Figure 1:
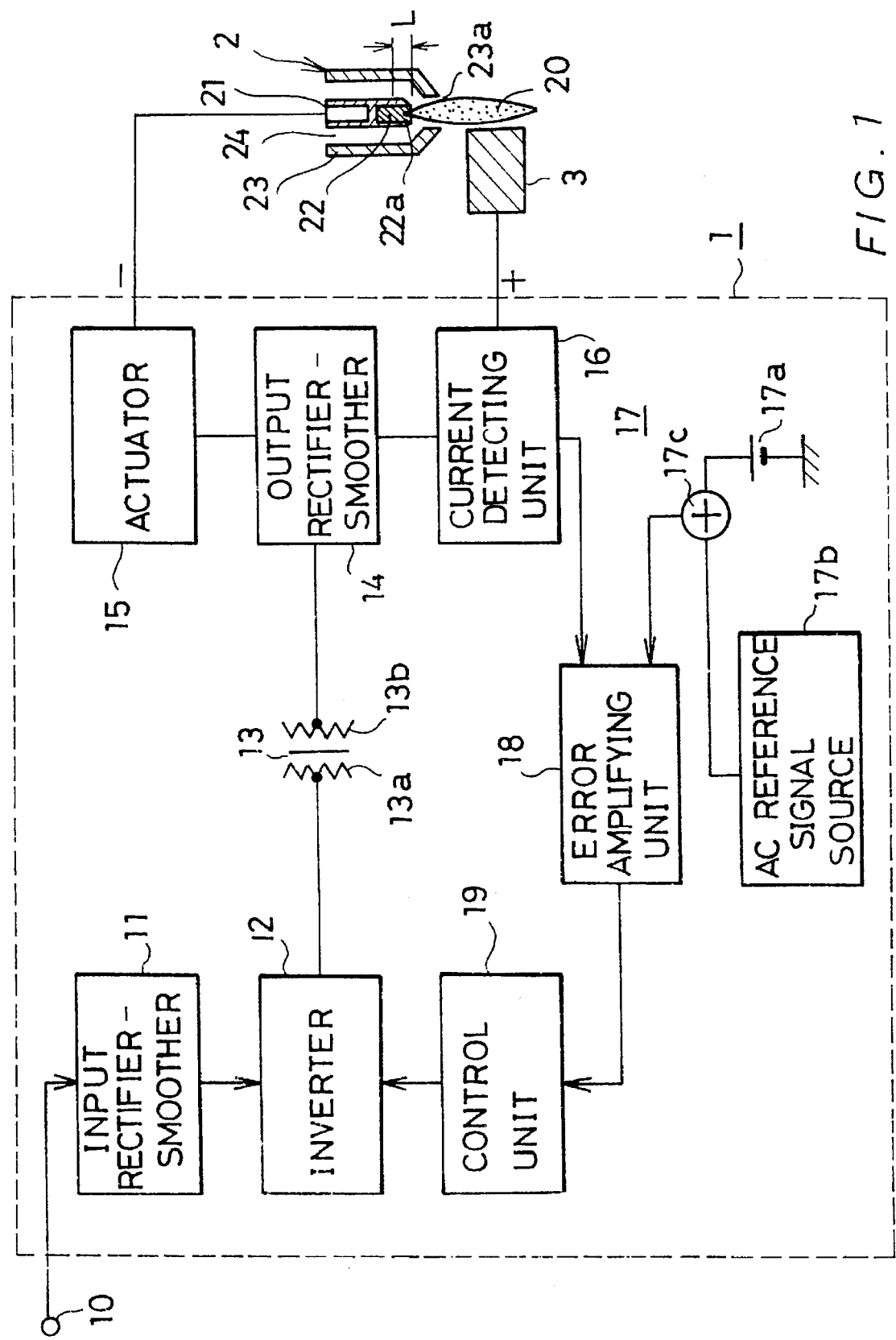
FIG. 1 is a schematic block diagram showing a plasma arc cutter including a power supply apparatus according to one embodiment of the present invention.

As shown in FIG. 1, a power supply apparatus 1 includes, for example, an inverter 12 formed of, for example, IGBT's (insulated gate bipolar transistors), to which applied is DC power provided by an input rectifier and smoother unit 11 which produces the DC power by rectifying and smoothing commercial AC power, for example, applied at an input terminal 10.

The DC power applied to the inverter 12 is converted to high-frequency power by the inverter 12, and the high-frequency power from the inverter 12 is applied to a primary winding 13a of a transformer 13, and high-frequency power with a lowered voltage is induced in a secondary winding 13b of the transformer 13. The induced high-frequency power is rectified and smoothed in output developing means, e.g. an output rectifier and smoother unit 14, and, then, applied via an activator 15 between an electrode 21 of a plasma torch 2 and a workpiece 3.

In order to detect the current flowing between the electrode 21 and the workpiece 3, a current detecting unit 16 is used. The output signal of the current detecting unit 16 is applied to an error amplifying unit 18 which also receives a reference signal from a reference signal generating unit 17. The reference signal generating unit 17 generates the reference signal by adding in an adder 17c, an AC reference signal component from an AC reference signal source 17b to a DC reference signal component having a predetermined value from a DC reference signal source 17a. The AC reference signal source 17b is arranged such that it can provide the AC reference signal component having variable frequency and amplitude. The frequency of the AC reference signal component is variable over a range of, for example, from 100 Hz to 500 Hz, and the peak-to-peak value of the AC reference signal component is variable over a range of, for example, from 0% to 20% of the DC reference signal component.

The error amplifying unit 18 develops a signal representative of the difference between the output of the current detecting unit 16 and the reference signal from the reference signal generating unit 17, and supplies the difference representative signal to an inverter control unit 19. The inverter control unit 19 controls the inverter 12 in such a manner that the output signal from the current detecting unit 16 becomes equal to the reference signal. Through the control provided by the control unit 19, the current supplied between the electrode 21 and the workpiece 3 is a predetermined DC current Ia on which an AC current having a predetermined frequency f and a predetermined amplitude Ip is superposed. The frequency f and amplitude Ip of the AC current superposed on the DC current Ia are controlled by varying the frequency and amplitude of the AC reference signal component in the reference signal generating unit 17.

In the illustrated power supply apparatus 1, the terminal connected to the electrode 21 is negative, and the terminal connected to the workpiece 3 is positive.

The plasma torch 2 includes the electrode 21 and a nozzle 23 surrounding the electrode 21. There is a space 24 formed between the electrode 21 and the nozzle 23. The nozzle 23 has an opening 23a at its tip end. The electrode 21 is a cylinder of a metal, such as copper, having a high electrical conductivity. A column of a refractory material, such as hafnium, zirconium and tungsten, is embedded in the tip end of the electrode 21 facing the opening 23a in the nozzle 23. The column has a length and a diameter of, for example, 3 mm and 2.5 mm, respectively.

Figure 2:
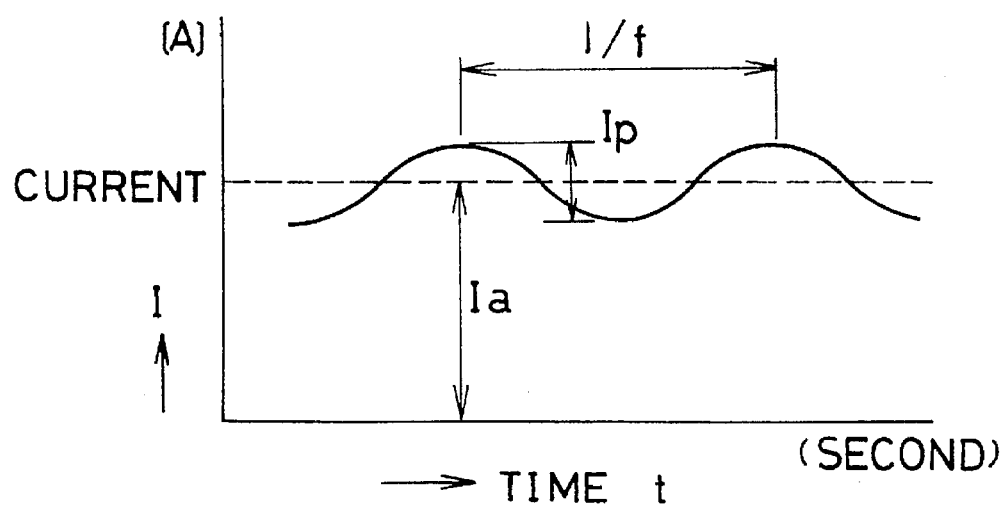
FIG. 2 shows a waveform of an output current to be supplied between an electrode of the plasma arc cutter and a workpiece shown in FIG. 1.

A plasma gas, such as compressed air, oxygen, argon, hydrogen and nitrogen, is fed into the space 24, and, at the same time, current as shown in FIG. 2 is supplied from the power supply apparatus of the invention to flow between the electrode 21 and the workpiece 3. In order to actuate an arc, a high voltage is also applied between the electrode 21 and the workpiece 3 from the actuator 15 for a short time from the beginning of supplying the current, to thereby generate a pilot arc. The time during which the high voltage is applied between the electrode 21 and the workpiece 3 is about 10 microseconds if arcing condition for the pilot arc is good. In such a case, the high voltage is applied in the form of a single pulse. If the pilot arc is not generated smoothly, the high voltage is applied for about 10–20 milliseconds. In this case, the high voltage assumes a form of a pulse voltage having a frequency of about 2–3 MHz.

Being stimulated by the pilot arc, a plasma arc 20 is generated between the electrode 21 and the workpiece 3, and the workpiece 3 is cut by the plasma arc 20. The plasma arc 20 is generated from the refractory material 22 in the electrode 21 and directed toward the workpiece 3 through the opening 23a in the nozzle 23.

The refractory material 22 in the electrode 21 from which the plasma arc 20 is generated is gradually consumed as the plasma arc 20 is generated.

Figure 3:
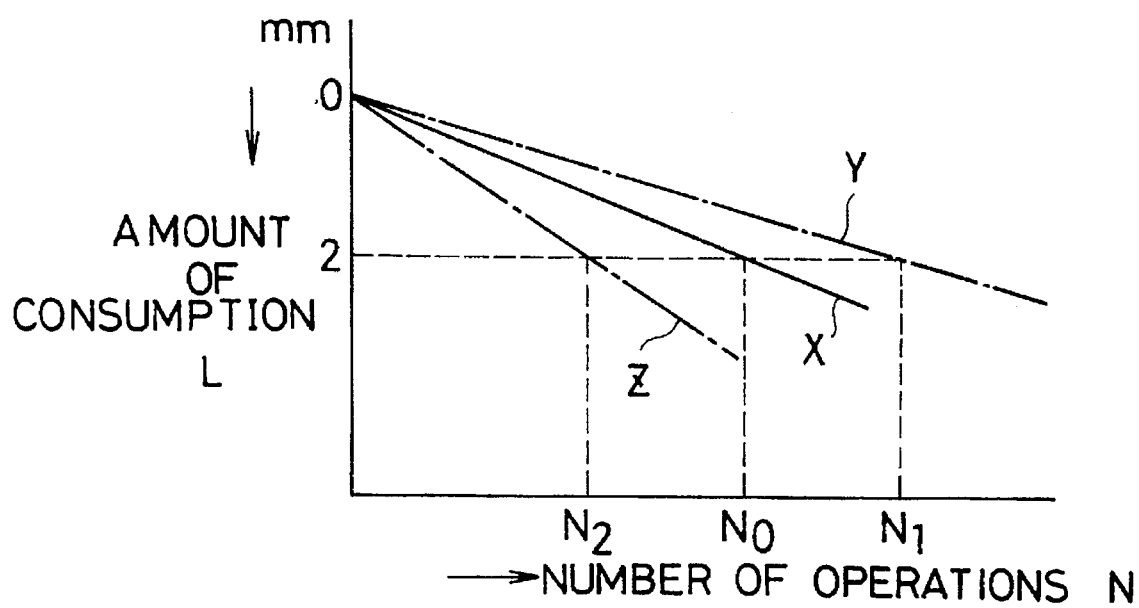
FIG. 3 is a graph showing the amount of electrode material consumed with respect to the number of operations of the cutter.

Now, referring to FIGS. 3 and 4, the consumed amount L of the refractory material 22 versus the amount of operation of the plasma arc cutter is described, for AC current contained in the current supplied between the electrode 21 and the workpiece 3 having different frequency f and amplitude Ip, in which compressed air was used as the plasma gas, the flow rate of the plasma gas was 100 liters/minute, the refractory material 22 was hafnium, and the average value of the current Ia applied to flow between the electrode 21 and the workpiece 3 was 70 A. The amount of operation of the plasma is expressed by the number of operation units. One operation unit comprises one ON/OFF operation of the power supply apparatus 1 in which the power supply apparatus 1 is operated for 60 seconds to cause plasma arc 20 to be generated and, thereafter, the power supply apparatus 1 is turned off for 80 seconds to turn off the plasma arc 20. The amplitude Ip of the AC current is not expressed in absolute value, but it is expressed in terms of a ratio to an average current (hereinafter referred to as percentage ripple) R. The percentage ripple is expressed as:

$$R=(Ip/Ia)\times 100[\%]$$

FIG. 3 is a graph showing the amount of consumption L of the refractory material 22 of the electrode 21 for the number of operations N of the plasma arc cutter. A solid line X represents the amount of consumption L when the percentage ripple R of the current applied between the electrode 21 and the workpiece 3 is zero (R=0), i.e. when DC current only is applied. The line X indicates that the consumed amount L of the refractory material of the electrode 21 is 2 mm after $N_0$ operation units, i.e. when the plasma arc cutter is operated $N_0$ times. Specifically, $N_0$ was ninety (90).

Lines Y and Z represent the amounts of consumption L of the refractory material in the electrode 21 for the number of operation units N, in which the current supplied contains AC current superposed on the DC current. The frequency f of the AC current contained in the supplied current and the percentage ripple R of the supplied current are different for the lines Y and Z. As is understood from the graph, the amount of consumption L for the same number of operation units N changes when the frequency f and the percentage ripple R change. The line Y indicates that the electrode 21 can be operated a larger number $N_1$ of operation units than $N_0$ before 2 mm of the refractory material is consumed. For example, a result like the one represented by the line Y was obtained when the frequency f of the superposed AC current was 300 Hz and the percentage ripple R of the supplied current was 10%. In this case, the number $N_1$ of operation units achieved was one hundred and thirty-five (135). When the frequency f of the superposed AC current was 500 Hz and the percentage ripple R was 10%, a result like the one represented by the line Y was obtained, in which the number of operation units $N_1$ achieved was one hundred (100).

The line Z, on the other hand, indicates that a smaller number of operations $N_2$ than $N_0$ can be achieved before the amount of consumption L becomes 2 mm. For example, a result like the one represented by the line Z was obtained with the frequency f of the superposed AC current being 60 Hz and with the percentage ripple R being 15%. The number of operations achieved in this case was seventy (70). In cases as represented by the line Z, sometimes dual arcing may be generated, one between the electrode 21 and the workpiece 3 and the other between the nozzle 23 and the workpiece 3, which can damage the nozzle 23. In the experiments, the occurrence of dual arcing was counted as indicating the end of lifetime of the electrode 21.

FIG. 4 is a graph showing the life of the electrode M for different frequencies f of AC current contained in the current supplied between the electrode 21 and the workpiece 3 and different percentage ripples R of the supplied current, in which the life of the electrode is 100 (M=100) for the number of operation units $N_0$ achieved before the amount L=2 mm is consumed as in the case represented by the line X in FIG. 3 wherein the percentage ripple R is zero.

In FIG. 4, lines A, B, C, and D represent respective cases in which AC currents of 60 Hz, 100 Hz, 300–360 Hz, and 500 Hz were superposed on DC current.

As is seen from the case A, when the frequency f of the superposed AC current was 60 Hz, the life M comparable with the one obtained from the use of DC current only was obtained with the percentage ripple R of less than about 9%, but when a larger percentage ripple R was employed, the life M became shorter or smaller than 100.

When the frequency f of the superposed AC current was 100 Hz, as represented by the curve B, the life M of the electrode, relative to the one when only DC current was employed, was about 1.06 times when the percentage ripple R was 5%, about 1.2 time, which was the longest, when R was 10%, about 1.03 time when R was 15%, and equal when R was 15.5%. When the percentage ripple R greater than 15.5% was employed, the life M of the electrode was shorter than the life obtained when only DC current was used.

The curve C represents the case in which the frequency f was within the range of from 300 Hz to 360 Hz. For any frequency f within this range, the life M of the electrode was about 1.2 times when the percentage ripple R was 5%, about 1.5 times, which was the longest, when R was 10%, about 1.34 times when R was 15%, and equal when R was 20%, in comparison with M=100 obtainable when DC current only was used. When R greater than 20% was used, the life M became shorter than the life when DC current only was used.

As is understood from the curve D in FIG. 4, when the frequency f of the superposed AC current was 500 Hz, the life M of the electrode was extended to about 1.1 time when the percentage ripple R of the current supplied between the electrode 21 and the workpiece 3 was 5%, about 1.23 time when R was 10%, and about 1.08 time when R was 15%, relative to the life M=100 when DC current only was used. When the percentage ripple R was 16.5%, the life was substantially equal to the one obtained with DC current only used. When R of greater than 16.5% was employed, the life of the electrode became shorter than the one obtained with DC current only used.

As described above, current which includes DC current and AC current having a frequency of from 100 Hz to 500 Hz superposed on the DC current, and which has a percentage ripple of less than 15.5% is used as the supply current to be supplied between the electrode 21 and the workpiece 3, a torch electrode can have a longer life than the life obtained by using DC current only as the supply current.

Also, a supply current containing AC current of a frequency of from 300 Hz to 500 Hz superposed on DC current, and having a percentage ripple of less than 16.5% is used, the life of the electrode can be further prolonged.

If the supply current contains AC current having a frequency of from 300 Hz to 360 Hz and has a percentage ripple of less than 20% the life of the electrode can be further more prolonged.

In the above-described embodiment, compressed air was used as a plasma gas, but, as previously described, other gas, such as oxygen, argon gas, hydrogen, and nitrogen, can be used instead. When such other gas was used, the same results were obtained.

In the illustrated embodiment, the inverter has been described to comprise IGBT's, but it may be formed of MOSFET's, GTO's, or any other suitable control elements.

Furthermore, in the illustrated embodiment, hafnium is used as the refractory material 22 of the electrode 21, but other material, such as tungsten and zirconium, may be used instead.

As the input power to the inverter 12 in the described embodiment, commercial AC power is used, which is rectified and smoothed in the input rectifier and smoother unit 11 before it is applied to the inverter 12, but DC power obtained by rectifying the output of an engine generator, DC power supplied from a welder power supply apparatus, or DC output of other switching power supply may be applied to the inverter 12 instead.

What is claimed is:

1. A power supply apparatus comprising:

an inverter for converting DC power into AC power;

output developing means for rectifying and smoothing an AC output from said inverter to develop output current to be supplied between an electrode and a workpiece which form together a plasma load;

current detecting means for detecting said output current;

reference signal generating means for generating a reference signal comprising a preset DC signal and a predetermined AC signal superposed on said DC signal; and control means for controlling said inverter in accordance with the difference between the output signal from said current detecting means and said reference signal so as to control said output current to have a predetermined, constant DC current and a predetermined AC current superposed on said DC current;

said reference signal generating means being capable of varying the frequency and amplitude of said AC signal contained in said reference signal.

2. The power supply apparatus according to claim 1 wherein the frequency of said reference signal is varied so as to vary the frequency of said AC current within a range of from 100 Hz to 500 Hz, and the amplitude of said reference signal is varied so as to vary the amplitude of said AC current within a range of from greater than 0% to less than 15.5% of the value of said DC current.

3. The power supply apparatus according to claim 1 wherein the frequency of said reference signal is varied so as to vary the frequency of said AC current within a range of from 300 Hz to 500 Hz, and the amplitude of said reference signal is varied so as to vary the amplitude of said AC current within a range of from greater than 0% to less than 16.5% of the value of said DC current.

4. The power supply apparatus according to claim 1 wherein the frequency of said reference signal is varied so as to vary the frequency of said AC current within a range of from 300 Hz to 360 Hz, and the amplitude of said reference signal is varied so as to vary the amplitude of said AC current within a range of from greater than 0% to less than 20% of the value of said DC current.

* * * * *